US012681421B2

(12) United States Patent
Sakaguchi et al.

(10) Patent No.: US 12,681,421 B2
(45) Date of Patent: Jul. 14, 2026

(54) IMAGE FORMING APPARATUS, CONTROL METHOD FOR THE SAME, AND STORAGE MEDIUM

(71) Applicant: CANON KABUSHIKI KAISHA, Tokyo (JP)

(72) Inventors: Ryou Sakaguchi, Chiba (JP); Hiroyuki Eda, Ibaraki (JP); Yuya Ohta, Chiba (JP); Shin Iwasaki, Chiba (JP); Yuga Yamauchi, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 19/070,386

(22) Filed: Mar. 4, 2025

(65) Prior Publication Data

US 2025/0298364 A1 Sep. 25, 2025

(30) Foreign Application Priority Data

Mar. 19, 2024 (JP) ................................ 2024-043249

(51) Int. Cl.

| | |
|---|---|
| ***G03G 21/02*** | (2006.01) |
| ***G03G 15/00*** | (2006.01) |
| ***G03G 15/01*** | (2006.01) |
| ***G06K 15/02*** | (2006.01) |
| ***G06K 15/14*** | (2006.01) |

(52) U.S. Cl.

CPC ......... *G03G 21/02* (2013.01); *G03G 15/0136* (2013.01); *G03G 15/0189* (2013.01); *G03G 15/50* (2013.01); *G03G 15/5029* (2013.01); *G03G 15/6591* (2013.01); *G06K 15/14* (2013.01); *G06K 15/1878* (2013.01)

(58) Field of Classification Search

CPC ............... G03G 21/02; G03G 15/0136; G03G 15/0189; G03G 15/50; G03G 15/5029; G03G 15/6591; G06K 15/14; G06K 15/1878

See application file for complete search history.

(56) References Cited

U.S. PATENT DOCUMENTS

| | | | | |
|---|---|---|---|---|
| 11,973,918 B2 * | 4/2024 | Yano | .................... | H04N 1/6072 |
| 2016/0085193 A1 * | 3/2016 | Yuasa | ................ | G03G 15/0136 399/39 |
| 2022/0197192 A1 * | 6/2022 | Kobayashi | ......... | G03G 15/1675 |

FOREIGN PATENT DOCUMENTS

| | | |
|---|---|---|
| JP | 2014107648 A | 6/2014 |
| JP | 5626618 B2 | 11/2014 |

* cited by examiner

*Primary Examiner* — Joseph S Wong

(74) *Attorney, Agent, or Firm* — Canon U.S.A., Inc., IP Division

(57) ABSTRACT

Provided is an image forming apparatus for performing an image adjustment in a monochrome image formation mode. In a case where color information for subsequent images includes a color image, the image forming apparatus does not perform an image adjustment in the monochrome image formation mode. Rather, image forming apparatus performs the image adjustment in a color image formation mode in a case where a subsequent color image is formed.

5 Claims, 9 Drawing Sheets

100

102 HDD

103 CPU

104 MEMORY

105 OPERATION UNIT

106 DISPLAY

101

107 LASER EXPOSURE UNIT

108 IMAGE FORMING UNIT

109 FIXING UNIT

110 PAPER FEED UNIT

111 IMAGE READING UNIT

112 ON-BELT PATTERN READING UNIT

113 BELT SEPARATION DRIVING UNIT

114 ACQUISITION UNIT

115 BELT ROTATION DRIVING UNIT

716

F1

PT-Y1
PT-Y2
PT-Y3
PT-Y4
PT-Y5

PT-M1
PT-M2
PT-M3
PT-M4
PT-M5

700

PT-C1
PT-C2
PT-C3
PT-C4
PT-C5

PT-K1
PT-K2
PT-K3
PT-K4
PT-K5

IMAGE FORMING APPARATUS, CONTROL METHOD FOR THE SAME, AND STORAGE MEDIUM

BACKGROUND

Field

The present disclosure relates to an image forming apparatus, a control method for the image forming apparatus, and a storage medium.

Description of the Related Art

As an image forming method used in full-color image forming apparatuses, there has been a known tandem method in which photoconductors for yellow, magenta, cyan, and black colors are arranged in parallel along the rotation direction of an intermediate transfer belt. In a tandem image forming apparatus, toner images are formed on the color photoconductors, and then the formed toner images are transferred in sequence to the intermediate transfer belt to be superimposed on top of one another. The color toner images formed on the intermediate transfer belt are then transferred to a recording sheet downstream in the conveyance direction of the intermediate transfer belt.

In the tandem image forming apparatus, at the formation of a monochrome image, the photoconductors for the yellow, magenta, and cyan are not used. Thus, the tandem image forming apparatus includes two types of contact modes: a monochrome contact mode in which the photoconductor for black color and the intermediate transfer belt are in contact with each other, and a color contact mode in which all the photoconductors and the intermediate transfer belt are in contact with each other.

In the tandem image forming apparatus, when forming a full-color image after a formation of a monochrome image, the image forming apparatus switches the contact mode from the monochrome contact mode to the color contact mode. Also, when switching from a full-color image formation to a monochrome image formation, the image forming apparatus switches the contact mode from the color contact mode to the monochrome contact mode. In this manner, changing the contact mode every time switching takes place between a full-color image formation and a monochrome image formation can result in downtime.

Japanese Patent No. 5626618 discusses that, in switching from a full-color image formation to a monochrome image formation, if subsequent images are monochrome images for a predetermined number of consecutive sheets, the contact mode is switched to the monochrome contact mode. If not, a monochrome image formation is performed in the color contact mode. This reduces the number of times the contact mode is changed compared to changing the contact mode every time a switching takes place from a color image formation to a monochrome image formation.

When images are continuously formed on recording sheets, image density may change due to environmental conditions, such as temperature and humidity, and developer used for image development may deteriorate. To prevent change in the image density, an image forming apparatus forms adjustment patterns on the intermediate transfer belt and reads the formed adjustment patterns with the image density sensor. Then, the image forming apparatus performs an image adjustment (hereinafter referred to as calibration) based on the image density of an adjustment pattern read by the image density sensor.

Japanese Patent Application Laid-Open No. 2014-107648 discusses an image forming apparatus that performs a calibration operation every time a predetermined number of sheets is continuously printed, providing stable image density.

In a color image forming apparatus, when monochrome images are continuously printed, an image adjustment (a calibration) is performed in the monochrome contact mode to change the image forming conditions for black color (this operation is hereinafter referred to as a monochrome calibration). Similarly, when full-color images are continuously printed, an image adjustment (a calibration) is performed in the color contact mode to change the image forming conditions for yellow, magenta, cyan, and black colors (this operation is hereinafter referred to as a color calibration).

In the monochrome calibration, the image formation conditions for yellow, magenta, and cyan will not be changed. Thus, when performing a print job with a mixture of pages that have only monochrome image(s) and pages that have at least one image with at least one additional color, the color calibration can be carried out immediately after the monochrome calibration. In this case, even though the monochrome (black) image density may not be changed, a calibration is performed in a short period of time, resulting in downtime due to the unnecessary calibration.

Such frequent image adjustments can reduce printing efficiency.

SUMMARY

The present disclosure is directed to providing an image forming apparatus in which image adjustments are not frequently performed.

An aspect of the present disclosure provides an image forming apparatus configured to operate an image forming job including a color image formation mode and a monochrome image formation mode, with the image forming apparatus including a first counter configured to perform a count of sheets on which color images are formed, a second counter configured to perform another count of sheets on which monochrome images are formed, one or more controllers that acquire information for at least one image on each sheet of the image forming job. The one or more controllers, in a case where a value of the count exceeds a first threshold in the color image formation mode, perform an image adjustment in the color image formation mode; in a case where a value of the another counter exceeds a second threshold in the monochrome image formation mode and information for at least one subsequent image does not include a full-color image, perform an image adjustment in the monochrome image formation mode; and in a case where the information for the at least one subsequent image includes a full-color image, perform an image adjustment in the color image formation mode when the subsequent full-color image is formed without performing an image adjustment in the monochrome image formation mode.

Further features of the present disclosure will become apparent from the following description of exemplary embodiments with reference to the attached drawings.

DESCRIPTION OF THE EMBODIMENTS

Hereinafter, some exemplary embodiments according to the present disclosure will be described in detail with reference to the drawings. However, the components in the exemplary embodiments to be described here are merely examples, and are not intended to limit the scope of the present disclosure.

Hardware of Image Forming Apparatus

<Image Forming Apparatus>

Figure 1:
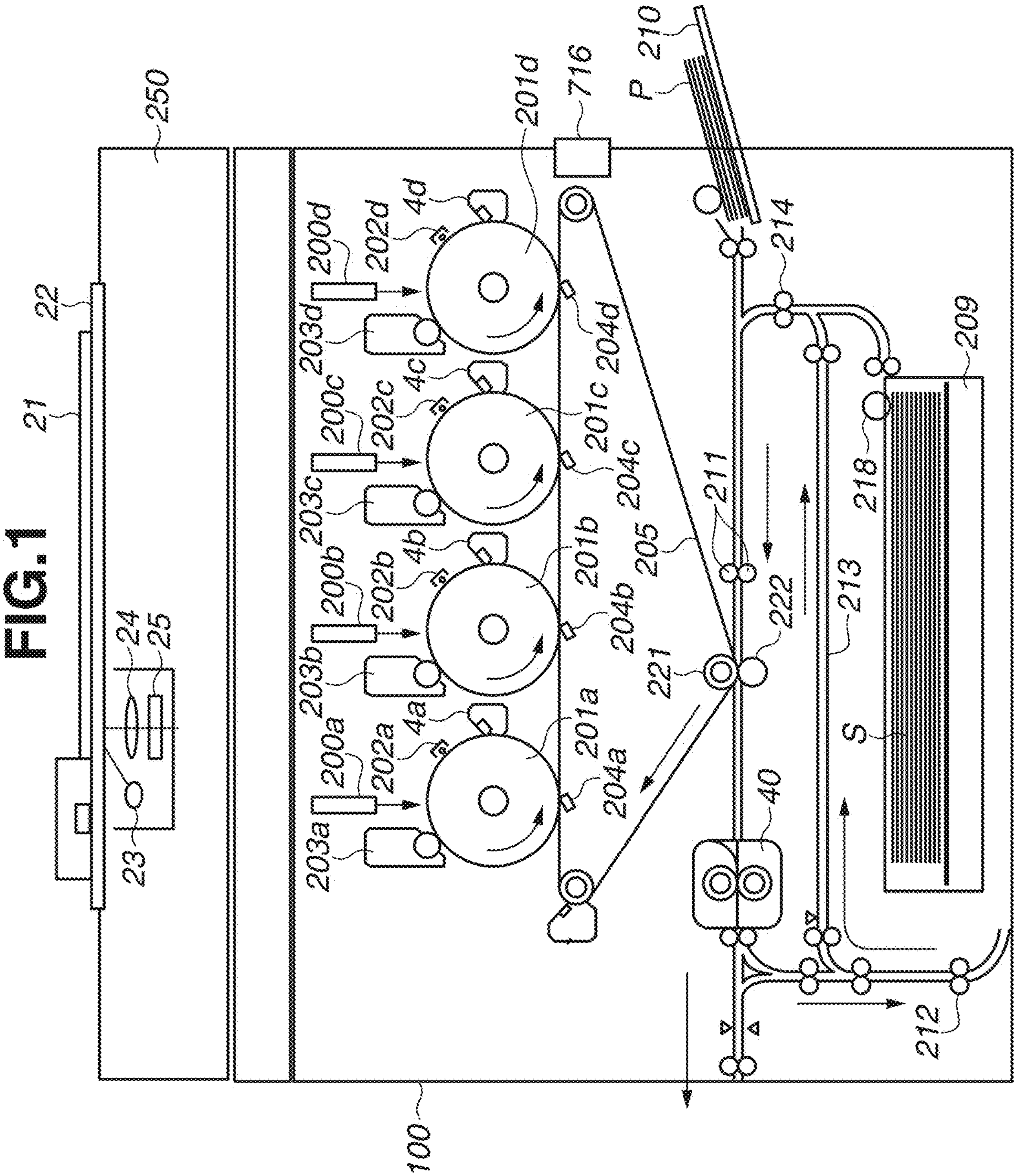
FIG. 1 is a cross-sectional view of an image forming apparatus according to an exemplary embodiment.

A first exemplary embodiment will be described. FIG. 1 is a cross-sectional view of a general configuration of an image forming apparatus according to the present exemplary embodiment, and illustrates a schematic configuration of an electrophotographic color printer.

In the image forming apparatus illustrated in FIG. 1, a plurality of photoconductive drums 201*a* to 201*d* for individual colors are electrically charged by chargers 202*a* to 202*d*.

Electrostatic latent images are formed on the charged photoconductive drums 201*a* to 201*d* with laser light (light beams) emitted from the corresponding laser scanner units 200*a* to 200*d* that use laser light-emitting elements as light sources. The electrostatic latent images are developed using toners by corresponding development units 203*a* to 203*d*.

The color toner images developed on the photoconductive drums 201*a* to 201*d* are then transferred to an intermediate transfer belt 205 by transfer biases applied to transfer blades 204*a* to 204*d*.

The toner images that are not transferred to the intermediate transfer belt 205 are removed by photoconductive drum cleaners 4*a* to 4*d* because they can cause image stains.

The toner images in four colors on the intermediate transfer belt 205 are collectively transferred to recording paper P between a secondary transfer inner roller 221 and a secondary transfer roller 222. After that, the recording paper P carrying the toner images thereon is subjected to a fixing process with heat and pressure at a fusing unit 40, and then ejected to the outside of the apparatus by a paper ejection roller.

An image density sensor 716 measures the unfixed image carried on the intermediate transfer belt 205. The image density sensor 716 is an optical sensor that includes a light emitting element and a light receiving element, for example, and measures reflected light from the unfixed image on the intermediate transfer belt 205.

The intensity or quantity of reflected light from the unfixed image varies depending on the quantity of toner attached to the unfixed image. The image forming apparatus 100 can detect the density of the unfixed image based on a table of conversion between the intensity of reflected light from the unfixed image and the density of the unfixed image, for example.

The recording paper P is fed from a paper feed cassette 209 or a manual feed tray 210, and timings for conveying the recording paper P are adjusted by registration rollers 211. The recording paper P is conveyed to the secondary transfer roller 222 and the inner secondary transfer roller 221.

In double-sided printing, the recording paper P through the fusing unit 40 is guided toward a double-sided reversing path 212, where the recording paper P is reversed and conveyed in the opposite direction. The recording paper P is then conveyed to a double-sided path 213. The recording paper P through the double-sided path 213 again passes through vertical path rollers 214, where an image is formed, transferred, and fixed on the second side of the recording paper P in the same manner as on the first side, and then the recording paper P is ejected.

A copy can be obtained through the above operations.

A reader 250 has an image reading function to capture image data on original documents set thereon. The reader 250 is a reading device that reads documents and test charts. A test chart refers to a sheet on which a plurality of pattern images is formed. A light source 23 emits light to a document 21 placed on a document table glass 22. An optical system 24 guides reflected light from the document 21 to a charge-coupled device (CCD) sensor 25 to form an image. The CCD sensor 25 generates red, green, and blue color component signals.

A reader image processing unit performs image processing (for example, a shading correction) on the color component signals obtained by the CCD sensor 25 to generate image data.

<Image Processing System>

Figure 2:
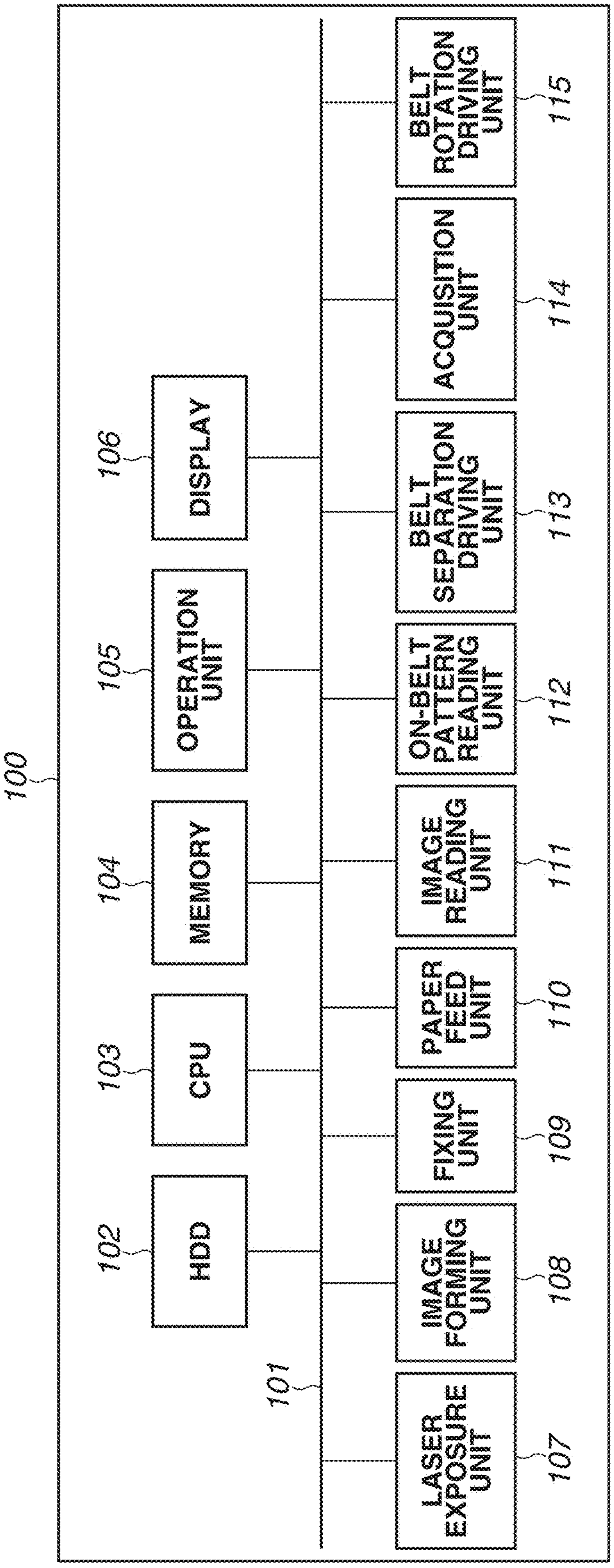
FIG. 2 is a block diagram illustrating a system configuration of the image forming apparatus according to the present exemplary embodiment.

FIG. 2 is a block diagram illustrating a system configuration of the image forming apparatus 100. The image forming apparatus 100 includes a hard disk device (HDD) 102, a central processing unit (CPU) 103, a memory 104, an operation unit 105, and a display 106. The image forming apparatus 100 further includes a laser exposure unit 107, an image forming unit 108, a fixing unit 109, a paper feed unit 110, an image reading unit 111, an on-belt pattern reading unit 112, a belt separation driving unit 113, an acquisition unit 114, and a belt rotation driving unit 115. These components are connected via a system bus 101.

The HDD 102 is a storage device in which programs and data are saved.

The CPU 103 comprehensively performs image processing control and printing control based on the programs saved in the HDD 102.

The memory 104 stores programs and image data for the CPU 103 to perform various processing with, and operates as a working area.

The operation unit 105 receives various setting inputs and operation instructions from a user.

The display 106 displays setting information on the image processing apparatus 100, and processing statuses of an image formation job.

The laser exposure unit 107 performs primary charging and laser exposure control for irradiating the photoconductive drums 201 with laser light to transfer toner images. In the laser exposure unit 107, first, the chargers 202 are used to perform primary charging by which the surfaces of the photoconductive drums 201 are electrically charged to uniform negative potentials. The photoconductive drums 201 are then irradiated with laser light by the laser scanner units 200*a* to 200*d* while the reflection angle is adjusted with polygon mirrors. This neutralizes the negative charge in the irradiated areas to form an electrostatic latent image.

The image forming unit 108 is a device for transferring toner to recording paper, and includes the development units 203, the transfer blades 204, and the secondary transfer roller 222. The image forming unit 108 transfers the toners on the photoconductive drums 201 to the recording paper. The development units 203 apply negatively charged toners from development cylinders to electrostatic latent images to the surfaces of the photoconductive drums, which makes the images visible. The transfer blades 204 perform primary transfers in which positive potentials are applied to the transfer blades 204 to transfer the toners on the surfaces of the photoconductive drums onto the transfer belt, and the secondary transfer roller 222 performs secondary transfer in which a positive potential is applied to the secondary transfer roller 222 to transfer the toners on the transfer belt to the recording paper.

The fixing unit 109 controls the fusing unit 40 that melts and fixes the toners to the recording paper with heat and pressure. The fusing unit 40 includes a heater, a fusing belt, and a pressure belt.

The paper feed unit 110 feeds recording paper, and the feeding and conveyance operations on the recording paper are controlled by the rollers and various sensors.

The image reading unit 111 controls the reader 250 based on instructions from the CPU 103 to read images on set recording paper. The read image data is then saved in the memory 104.

The on-belt pattern reading unit 112 controls the image density sensor 716 based on instructions from the CPU 103 to read on-belt patterns formed on the intermediate transfer belt 205.

The belt separation driving unit 113 controls the switching between the color contact mode and the monochrome contact mode using an intermediate transfer belt separation mechanism described below. The color contact mode is a mode in which the intermediate transfer belt 205 contacts all of the photoconductive drums 201*a* to 201*d*, and the monochrome contact mode is a mode in which the intermediate transfer belt 205 contacts the monochrome photoconductive drum 201*d* alone.

The acquisition unit 114 reads the image data saved in the memory 104, and acquires color information indicating whether the read image is a monochrome image or a full-color image.

<Separation Configuration of Intermediate Transfer Belt>

Figure 3A:
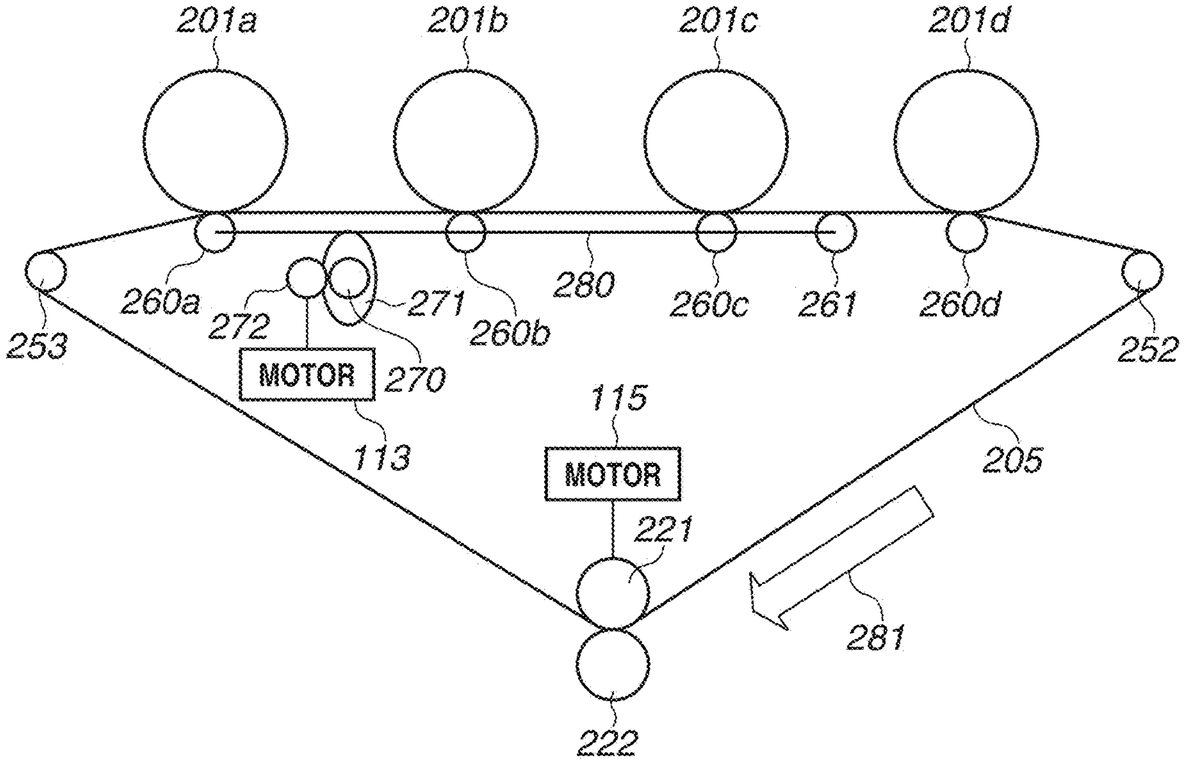
FIGS. 3A and 3B are cross-sectional views of a separation configuration of an intermediate transfer belt according to the present exemplary embodiment.
Figure 3B:
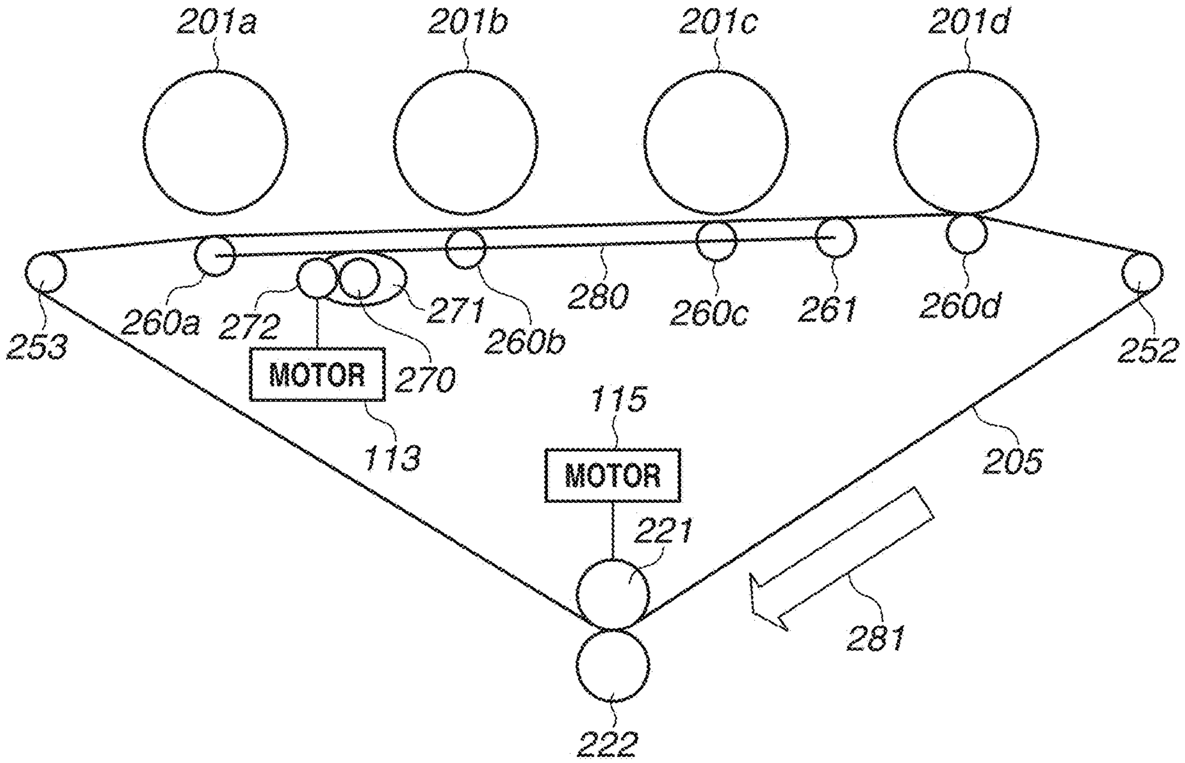

FIGS. 3A and 3B are schematic diagrams illustrating a detailed configuration of a separation configuration unit used in changing the contact mode of the intermediate transfer belt 205. In particular, FIG. 3A illustrates a state in the color contact mode, and FIG. 3B illustrates a state in the monochrome contact mode.

The position of the intermediate transfer belt 205 relative to the color toner photoconductive drums 201*a* to 201*c* differs between the color contact mode and the monochrome contact mode. The color contact mode is a mode for mainly forming full-color images, and the monochrome contact mode is a mode for forming monochrome images. In forming a full-color image, the color contact mode is used. In forming a monochrome image, the monochrome contact mode is usually used. It is also possible to form a monochrome image in the color contact mode. In the case of forming a monochrome image in the color contact mode, operations, such as development, are not performed on the color toner photoconductors 201*a* to 201*c*.

As described above, the color contact mode and the monochrome contact mode define the position of the intermediate transfer belt 205 during image formations. In the present exemplary embodiment, the color contact mode is selected in forming a full-color image and the monochrome contact mode is selected in forming a monochrome image (unless the job is interrupted). For the sake of convenience, these modes are referred to as an image formation mode.

The intermediate transfer belt 205 is supported by support rollers 252 and 253 and the secondary transfer inner roller 221. The secondary transfer inner roller 221 is driven by the belt rotation driving unit 115 to rotate the intermediate transfer belt 205 in the directions of arrows 281.

In the color image formation mode, the toner images in yellow, magenta, cyan, and black colors formed on the photoconductive drums 201 are transferred in sequence onto the rotating intermediate transfer belt 205 and superimposed on top of one another to form a color toner image on the intermediate transfer belt 205. The color toner image formed on the intermediate transfer belt 205 is conveyed in the directions of the arrows 281 along with the rotation of the intermediate transfer belt 205, and is transferred by the secondary transfer roller 222 onto a surface of the recording paper P fed and conveyed from a paper feed roller 218.

In forming a monochrome image, a black toner image formed on the photoconductive drum 201*d* is transferred onto the intermediate transfer belt 205, and then the toner image on the intermediate transfer belt 205 is transferred to a surface of the recording paper P.

As described above, a toner image is formed on at least one photoconductive drum 201 based on an image forming job, and the toner image formed on the photoconductive drum 201 is primarily transferred onto the intermediate transfer belt 205.

Further, the toner image on the intermediate transfer belt 205 is secondarily transferred to the recording paper P.

In the color image formation mode (FIG. 3A), the intermediate transfer belt 205 is in contact with the black toner photoconductor 201*d*, as well as the three color toner photoconductive drums 201*a* to 201*c* as color image carriers. On the other hand, in the monochrome image formation mode (FIG. 3B), the yellow, magenta, and cyan toners are not used in image formations. Thus, the intermediate transfer belt 205 is in contact with the black toner photoconductor 201*d*, and is not in contact with but is spaced apart from the color toner photoconductive drums 201*a* to 201*c*.

A configuration and a control mechanism for bringing the intermediate transfer belt 205 into contact with and separating from the color toner photoconductive drums 201*a* to 201*c* will be described.

Primary transfer rollers 260*a* to 260*c* are connected to a frame 280 rotatable with respect to the frame 280. The frame 280 is connected to a pivot shaft 261 and pivotable about the pivot shaft 261. A cam 271 is disposed engageable with the frame 280.

A gear 270 is coaxially attached to the cam 271, and meshes with a gear 272. The gear 270 rotates as the gear 272 is rotationally driven by the belt separation driving unit 113 serving as a moving unit, and the cam 271 also rotates along with the rotation of the gear 270. As the cam 271 pushes the frame 280 upward, the frame 280 is pivoted in the clockwise direction in FIGS. 3A and 3B and rises. As the cam 271 is shifted in a retracting direction, the frame 280 is pivoted in the counterclockwise direction in FIGS. 3A and 3B and descends under its own weight or by the force of a not-illustrated biasing member.

The primary transfer rollers 260*a* to 260*c* are shifted along with the shift of the frame 280. Thus, the primary transfer rollers 260*a* to 260*c* coupled to the frame 280 rise/descend along with the rising/descending of the frame 280. Portions of the intermediate transfer belt 205 between the primary transfer rollers 260*a* to 260*c* and the photoconductive drums 201*a* to 201*c* come into contact with/separate from the photoconductive drums 201*a* to 201*c* by the rise/descent of the primary transfer rollers 260*a* to 260*c*.

In the color contact mode (FIG. 3A), the intermediate transfer belt 205 contacts all the four photoconductive drums 201, and that position of the intermediate transfer belt 205 is hereinafter referred to as a color contact position. In the monochrome contact mode (FIG. 3B), the intermediate transfer belt 205 contacts the black toner photoconductive drum 201*d* alone, which is one of the image carriers, and that position of the intermediate transfer belt 205 is hereinafter referred to as a monochrome contact position.

However, a mechanism for bringing the intermediate transfer belt 205 into contact with and away from the color toner photoconductive drums 201*a* to 201*c* is not limited to the cam mechanism in the example. The mechanism can be any mechanism as long as it can move the intermediate transfer belt 205 and switch the position of the intermediate transfer belt 205 relative to the color toner photoconductive drums 201*a* to 201*c* between the color contact position and the monochrome contact position.

As can be seen from FIGS. 3A and 3B, to switch the image formation mode between the color contact mode and the monochrome contact mode, the intermediate transfer belt 205 is moved, which takes a considerable amount of time for switching.

<Image Density Sensor>

Images formed on recording paper vary in image density due to environmental conditions, such as temperature and humidity, and deterioration of developer used for image development. To keep constant densities of images formed on the recording paper, the image forming apparatus 100 in the present exemplary embodiment forms a toner image on the intermediate transfer belt 205 every time a predetermined number of sheets are continuously printed, and reads the density of the formed toner image with the image density sensor 716. A calibration operation is then performed to adjust the image formation conditions based on the result of a comparison between the result read by the image density sensor 716 and a target output value of the image density sensor 716.

Figure 4:
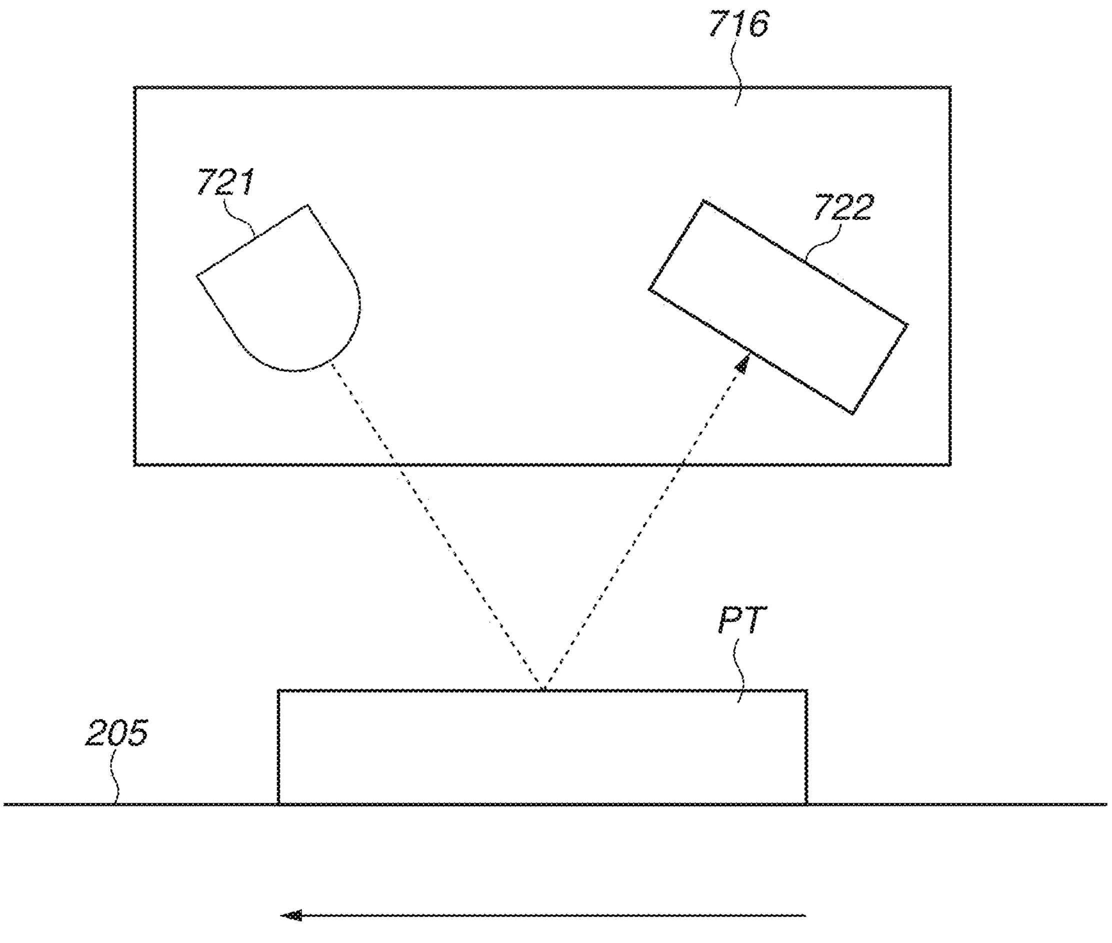
FIG. 4 is a cross-sectional view of a configuration of an image density sensor according to the present exemplary embodiment.

The image density sensor 716 in the present exemplary embodiment will now be described. FIG. 4 is a configuration diagram of the image density sensor 716. The image density sensor 716 in the present exemplary embodiment is a specular reflection sensor that detects specularly reflected light from a test pattern PT, which is a test image on the intermediate transfer belt 205. The image density sensor 716 includes a light emitting element 721, a light receiving element 722, and the on-belt pattern reading unit 112 (FIG. 2). The light emitting element 721 is a light source that outputs light toward a measurement position. The light emitting element 721 is a light emitting diode, for example. The light receiving element 722 is an element that receives specularly reflected light from the test pattern PT or the intermediate transfer belt 205 passing the measurement position. The light receiving element 722 is a photodiode, for example. The on-belt pattern reading unit 112 controls the quantity of light emitted (the quantity of irradiation light) from the light emitting element 721 as one of irradiation conditions. The on-belt pattern reading unit 112 controls the light emitting element 721 based on instructions from the CPU 103.

The light emitting element 721 is disposed such that its optical axis forms a 45 degree angle with respect to the normal line of the intermediate transfer belt 205. The light receiving element 722 is disposed to be linearly symmetrical with the light emitting element 721 with respect to the normal line of the intermediate transfer belt 205. The light receiving element 722 outputs a current based on a light receiving result (a reflected light level). The on-belt pattern reading unit 112 converts the current output from the light receiving element 722 into a voltage, and further converts the voltage into a digital value and transmits the digital value to the CPU 103. The digital value is a detection result (an output value) of the image density sensor 716.

Test Pattern Measurement Example

Figure 5:
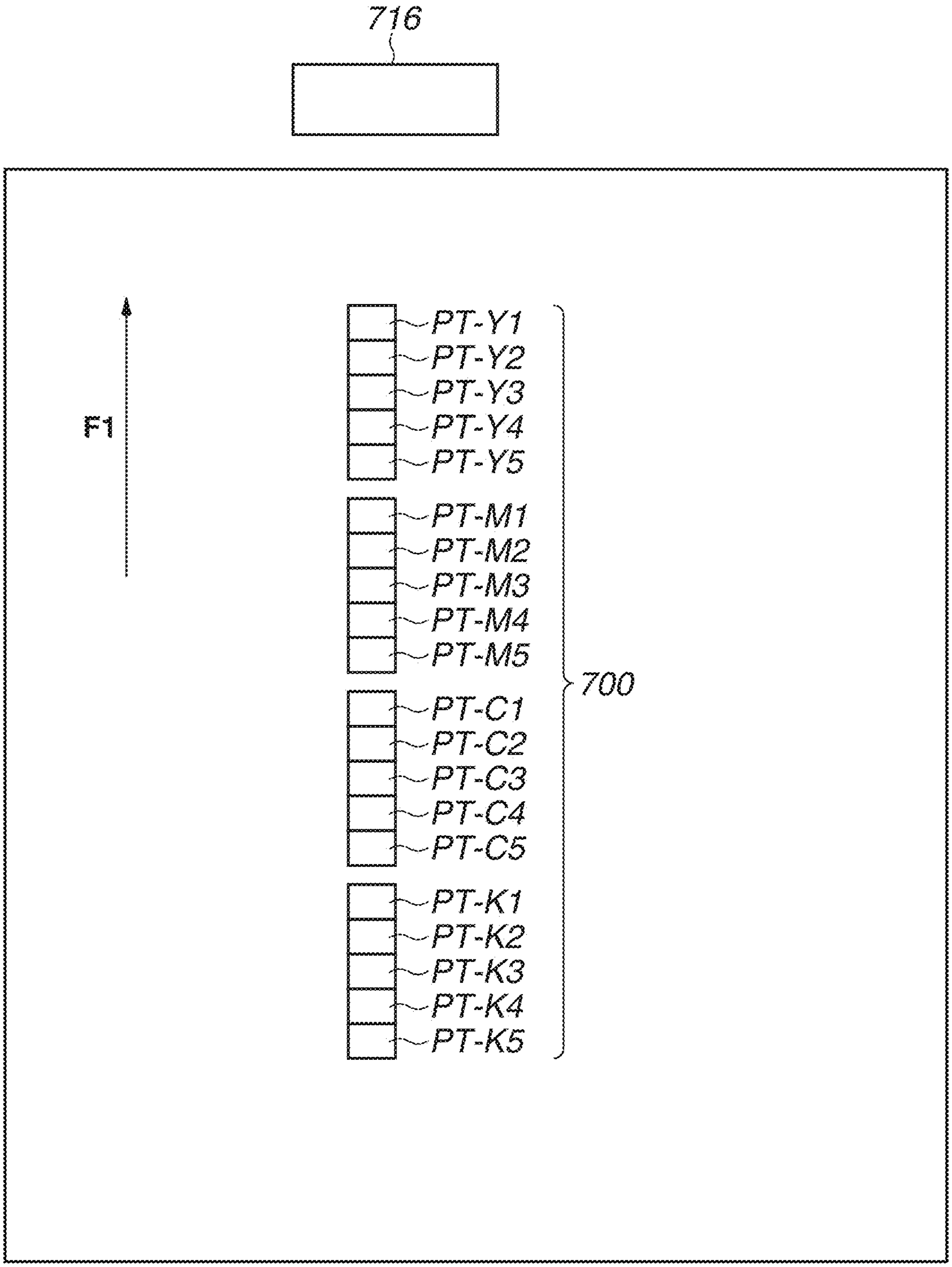
FIG. 5 is a diagram illustrating image patterns at the time of a calibration according to the present exemplary embodiment.

FIG. 5 illustrates an example in which test patterns PT included in a test image pass the measurement position. The CPU 103 uses a conversion table in the memory 104 for converting output values of the image density sensor 716 into image density values of the test patterns PT to convert output values of the image density sensor 716 into image density values. The conversion table is provided in advance in accordance with output characteristics of the image density sensor 716, and is stored in the memory 104 beforehand.

The image density sensor 716 can be a diffuse reflection sensor that receives diffusely reflected light. A specular reflection sensor can detect yellow, magenta, cyan, and black toner images. However, as the density signal of a test pattern PT approaches 100%, the detection accuracy decreases. A diffuse reflection sensor can detect yellow, magenta, and cyan toner images even with the density signal indicating 100%. However, a diffuse reflection sensor cannot detect black toner images. Thus, ideally, the image density sensor 716 includes both a specular reflection sensor and a diffuse reflection sensor. The image density sensor 716 can accurately detect yellow, magenta, cyan, and black test patterns PT even with the density signal indicating 100%.

<Calibration Operation>

FIG. 5 is a diagram illustrating an example of a test image formed on the intermediate transfer belt 205 in order to keep image densities constant. A test image 700 includes test patterns PT_Y, PT_M, PT_C, and PT_K formed with toners of the respective colors of yellow, magenta, cyan, and black.

In the color test patterns PT, five test patterns for each color are formed in line in a rotation direction F1 of the intermediate transfer belt 205. The image density sensor 716 is disposed such that the detection position corresponds to the position of the test patterns PT on the intermediate transfer belt 205. The image density sensor 716 detects the test patterns PT passing the detection position as the intermediate transfer belt 205 rotates.

The test patterns PT each have a rectangular shape and a size of 25 mm×25 mm, for example. In the present exemplary embodiment, the test patterns PT are formed with various high voltages set (high voltages for charging, development, primary transfer, and secondary transfer) for image formation while the exposure quantity LPW of the laser scanner unit 200*a* to 200*d* is changed in 20% steps. For example, a PT_Y1 uses an exposure quantity of 20% where the maximum output of the laser scanner unit is 100%, a PT_Y2 an exposure quantity of 40%, a PT_Y3 an exposure quantity of 60%, a PT_Y4 an exposure quantity of 80%, and a PT_Y5 an exposure quantity of 100%. An image density D_x(i) of each of the test patterns is then detected. A target density T is set among detected image densities, and i is determined such that the relationship in Equation (1) is satisfied:

$$D\_x(i) \leq T \leq D\_x(i+1) \tag{1}$$

where x is Y, M, C, and K, and i is a value between 1 and 4.

An exposure quantity LPW that satisfies the target density T is determined by linear interpolation using a light quantity and an image density when the i-th patch is formed and a light quantity and an image density when the i+1-th patch is formed. The exposure quantity LPW may be determined based on the formula in Equation (2):

$$LPW = 20 \times i + 20 \times (T - D\_x(i)) \div (D\_x(i+1) - D\_x(i)) \tag{2}$$

For example, if T=1.5, the image density D_x(3) with the PT_Y3 (an exposure quantity of 60%) is 1.2, and the image density D_x(4) with the PT_Y4 (an exposure quantity of 80%) is 1.6, the exposure quantity LPW determined by the calibration is determined to be 75% as being equal to 75, i.e.:

$$LPW = 20 \times 3 + 20 \times (1.5 - 1.2) \div (1.6 - 1.2) = 75.$$

With the above calibration and the corrected exposure quantity LPW of the laser scanner unit 200_a_ to 200_d_, the image forming apparatus in the present exemplary embodiment keeps image densities constant. The test image 700 illustrated in FIG. 5 is used in performing a calibration in a full-color contact operation. A test image for performing a calibration during the monochrome contact operation is formed by five test patterns PT_K alone in black toner.

In the present exemplary embodiment, a calibration operation is performed every time a number (e.g., 200) of consecutive images are formed after the previous calibration. In the calibration operation in the monochrome image formation mode, the exposure quantity LPW for black can be corrected, but the exposure quantities LPW of yellow, magenta, and cyan will not be corrected. The exposure quantities LPW of yellow, magenta, and cyan are corrected by the calibration operation in the color image formation mode. Thus, in order to perform the calibration operation every time the number (e.g., 200) of images of each color are formed, two counters, i.e., a monochrome counter and a color counter, are used. The monochrome counter counts the number of prints in the color/monochrome image formation mode after the monochrome/color calibration is performed. On the other hand, the color counter counts the number of prints in the color image formation mode after the color calibration is performed.

Calibration Execution Decision Flow

Figure 6:
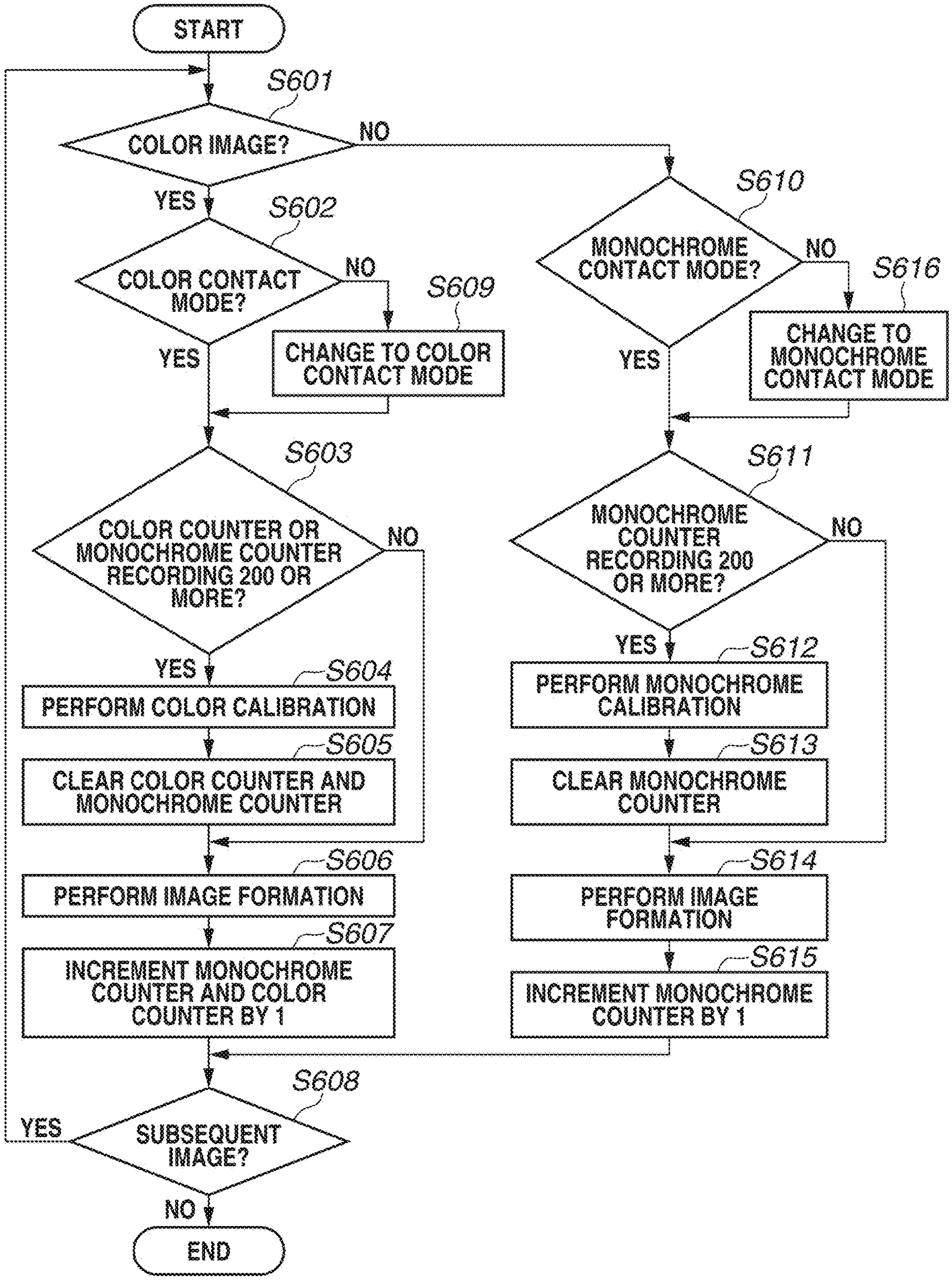
FIG. 6 is a flowchart of a calibration execution determination procedure in a conventional control.

FIG. 6 illustrates a procedure of determining whether to execute an image adjustment (a calibration) in a conventional control. This process is performed by the CPU 103 loading programs stored in the HDD 102 into the memory 104 and executing the programs. The process is started when an image forming job is executed.

In step S601, when the image forming operation is started, the CPU 103 determines whether the image to be printed includes at least one image that includes more than one color (i.e., a full-color image). If the CPU 103 determines that the image to be printed is a full-color image (YES in step S601), the process proceeds to step S602. If not (if the image to be printed is a monochrome image) (NO in step S601), the process to proceeds to step S610.

(Color Image Formation Mode)

In step S602, the CPU 103 determines whether the current contact mode of the intermediate transfer belt 205 is the color contact mode. If the current contact mode is the color contact mode (YES in step S602), the process proceeds to step S603. If not (NO in step S602), the process proceeds to step S609.

In step S609, the CPU 103 controls the belt separation driving unit 113 to change to the color contact mode in which the intermediate transfer belt 205 and all the photoconductive drums are in contact with each other, and the process proceeds to step S603.

In step S603, the CPU 103 determines whether either the color counter or the monochrome counter in the memory 104 records a predetermined threshold, e.g., 200 images, or more. If either of the counters records the predetermined threshold of 200 or more (YES in step S603), the process proceeds to step S604. If not (NO in step S603), the process proceeds to step S606.

At the time when the process reaches step S604, the color contact mode is selected, and thus, a color calibration operation is determined to be performed. The CPU 103 performs the color calibration operation and corrects the exposure quantity LPW of the laser scanner unit 200_a_ to 200_d_.

In step S605, the CPU 103 clears the monochrome counter and the color counter (reset to 0) and saves the cleared state in the memory 104. Both the color counter and the monochrome counter are cleared in step S605 because the exposure quantity LPW for black is also corrected by performing the color calibration, making it unnecessary to perform the monochrome calibration.

In step S606, the CPU 103 instructs the laser exposure unit 107, the image forming unit 108, the fixing unit 109, and the paper feed unit 110 to form an image, and a full-color image forming operation is performed. If it is determined in step S603 that neither of counter records the predetermined threshold (e.g. 200) or more, the process in step S606 is executed without performing a calibration.

In step S607, the CPU 103 increments the monochrome counter and the color counter by one, and saves the incremented values in the memory 104.

In step S608, the CPU 103 determines whether a subsequent image exists. If a subsequent image exists (YES in step S608), the process returns to step S601. If no subsequent image exists (NO in step S608), the image forming operation is ended.

(Monochrome Image Formation Mode)

In step S601, if the CPU 103 determines that the image to be printed is not a full-color image, the process proceeds to step S610.

In step S610, it is determined whether the current contact mode of the intermediate transfer belt 205 is the monochrome contact mode. If it is determined that the current contact mode is the monochrome contact mode (YES in step S610), the process proceeds to step S611. If not (NO in step S610), the process proceeds to step S616.

In step S616, the CPU 103 uses the belt separation driving unit 113 to change the contact mode of the intermediate transfer belt 205 and the plurality of photoconductive drums to the monochrome contact mode, and the process proceeds to step S611.

In step S611, the CPU 103 determines whether the monochrome counter in the memory 104 records a predetermined threshold (e.g. 200) or more. If the CPU 103 determines that the monochrome counter records the predetermined threshold (e.g. 200) or more (YES in step S611), the process proceeds to step S612. If not (NO in step S611), the process proceeds to step S614.

In step S612, the CPU 103 performs a monochrome calibration operation to correct the exposure quantity LPW of the black laser scanner unit 200*d.*

In step 613, the CPU 103 clears the monochrome counter (reset to 0) and saves the cleared state in the memory 104.

After step S613 or step S611, the process proceeds to step S614.

In step S614, the CPU 103 instructs the laser exposure unit 107, the image forming unit 108, the fixing unit 109, and the paper feed unit 110 to form an image, and a monochrome image forming operation is performed.

In step S615, the CPU 103 increments the monochrome counter by one and records the incremented value in the memory 104.

Thereafter, the process proceeds to step S608.

<Calibration Timing for Color-Mixed Job>

A calibration execution determination procedure in the conventional control is performed based on color information for a page (sheet) alone on which an image formation is to be performed, regardless of the images of the subsequent pages (sheets). Thus, when a job with a mixture of monochrome and color images is performed, an unnecessary monochrome image adjustment can be performed.

(Conventional Control)

Figure 7A:
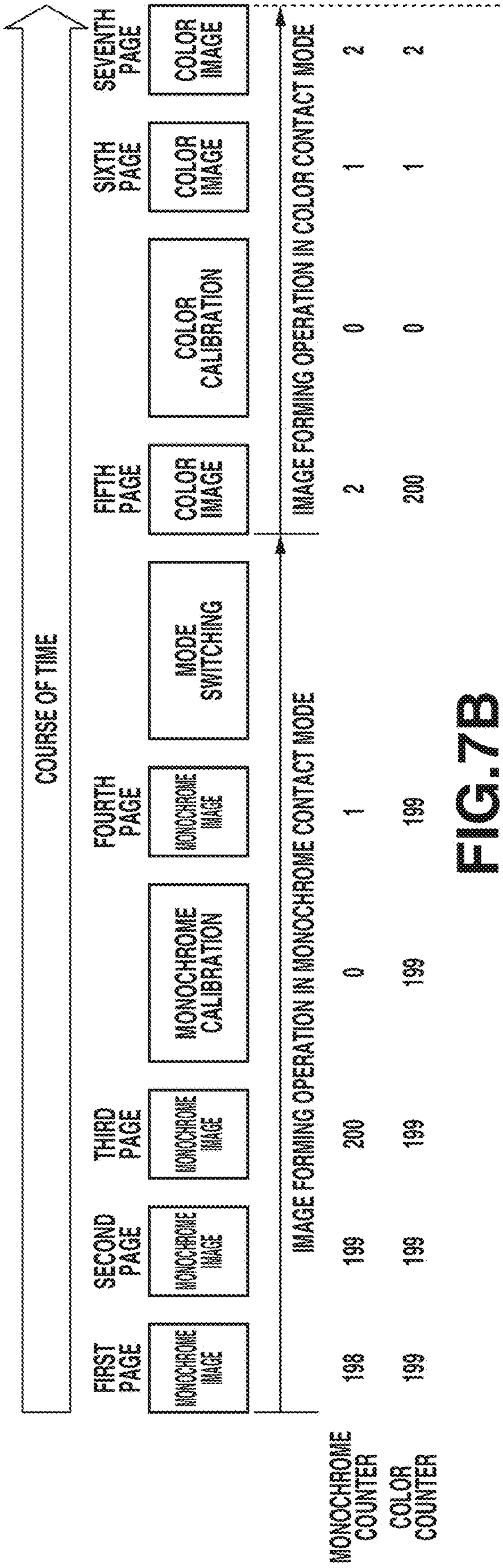
FIGS. 7A and 7B are timing charts illustrating calibration operation timings.

FIG. 7A is a diagram illustrating adjustment timings in the calibration execution determination procedure in the conventional control applied to a color-mixed job with a mixture of monochrome and color images.

FIG. 7A illustrates an example where at least one monochrome image is continuously printed on four sheets (pages) in the monochrome image formation mode, the first page being to be subjected to monochrome printing with 198 as the monochrome counter and 199 as the color counter. Color images are then printed on three sheets (pages). After a calibration operation determination is performed based on the calibration execution determination procedure in the conventional control, the monochrome counter records 200 upon printing of the monochrome image of the third page. Thus, before the monochrome image of the fourth page is printed, a monochrome calibration is performed. After the end of the calibration, the monochrome counter is cleared (reset to 0), and when the monochrome image of the fourth page is printed, the monochrome counter records 1. On the other hand, the color counter is not incremented when the monochrome image is printed, and the color counter is not cleared when the monochrome calibration is performed.

Thus, when the monochrome image of the fourth page is printed, the color counter remains 199. Then, when the image formation mode is switched to the color image formation mode and the color image of the fifth page is printed, both the monochrome counter and the color counter are incremented by 1, so that the monochrome counter records 2 and the color counter records 200. Thus, color calibration is performed before printing the color image of the sixth page. After the end of the color calibration, the monochrome counter and color counter are cleared (reset to 0), and then are incremented by 1 each time a color image is printed.

As described above, in an image forming job with a mixture of monochrome and color images, when a calibration execution determination is made as in the conventional control, a color calibration may be executed upon printing of a few pages (sheets) after a monochrome calibration is executed. Thus, even though no image density is changed, the forming conditions for black images are changed continuously, and unnecessary calibrations are executed.

Control in First Exemplary Embodiment

In the present exemplary embodiment, at the time of a calibration execution determination before an image formation on each page, the image information(s) for the following four pages (sheets) is acquired and it is checked whether the images of the following pages (sheets) include a full-color image. Even though the monochrome counter exceeds 200 as the predetermined threshold when the images of the following pages include a color image, a monochrome calibration is not performed, but a color calibration is performed after switching to the color image formation mode. Thus, unnecessary execution of monochrome calibrations with color-mixed jobs is prevented.

Figure 7B:
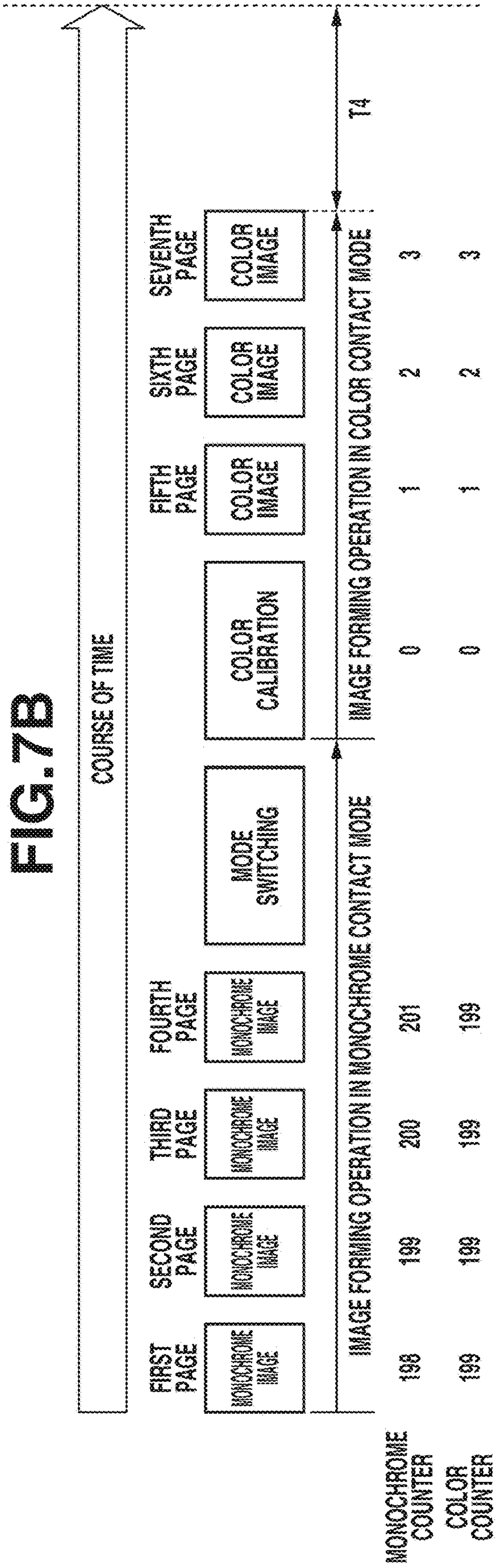

FIG. 7B is a diagram illustrating adjustment timings with the calibration execution determination according to the present exemplary embodiment.

Similar to FIG. 7A, when the monochrome image of the third page is printed, the monochrome counter records 200, which exceeds the threshold for determining whether a monochrome calibration is to be performed. At this time, the color information for the following four pages (sheets) is acquired in the calibration execution determination according to the present exemplary embodiment. After one monochrome image is printed, the subsequent three full-color images are printed, and a monochrome calibration thus is not performed. Instead, a color calibration is performed after switching to the color image formation mode, specifically, after switching the contact mode of the intermediate transfer belt 205 to the color contact mode. This makes it possible to reduce the number of times a monochrome calibration is performed, and the downtime by is reduced by a period of time (T4, as illustrated in FIG. 7B).

Calibration Execution Determination Flow (First Exemplary Embodiment)

Figure 8:
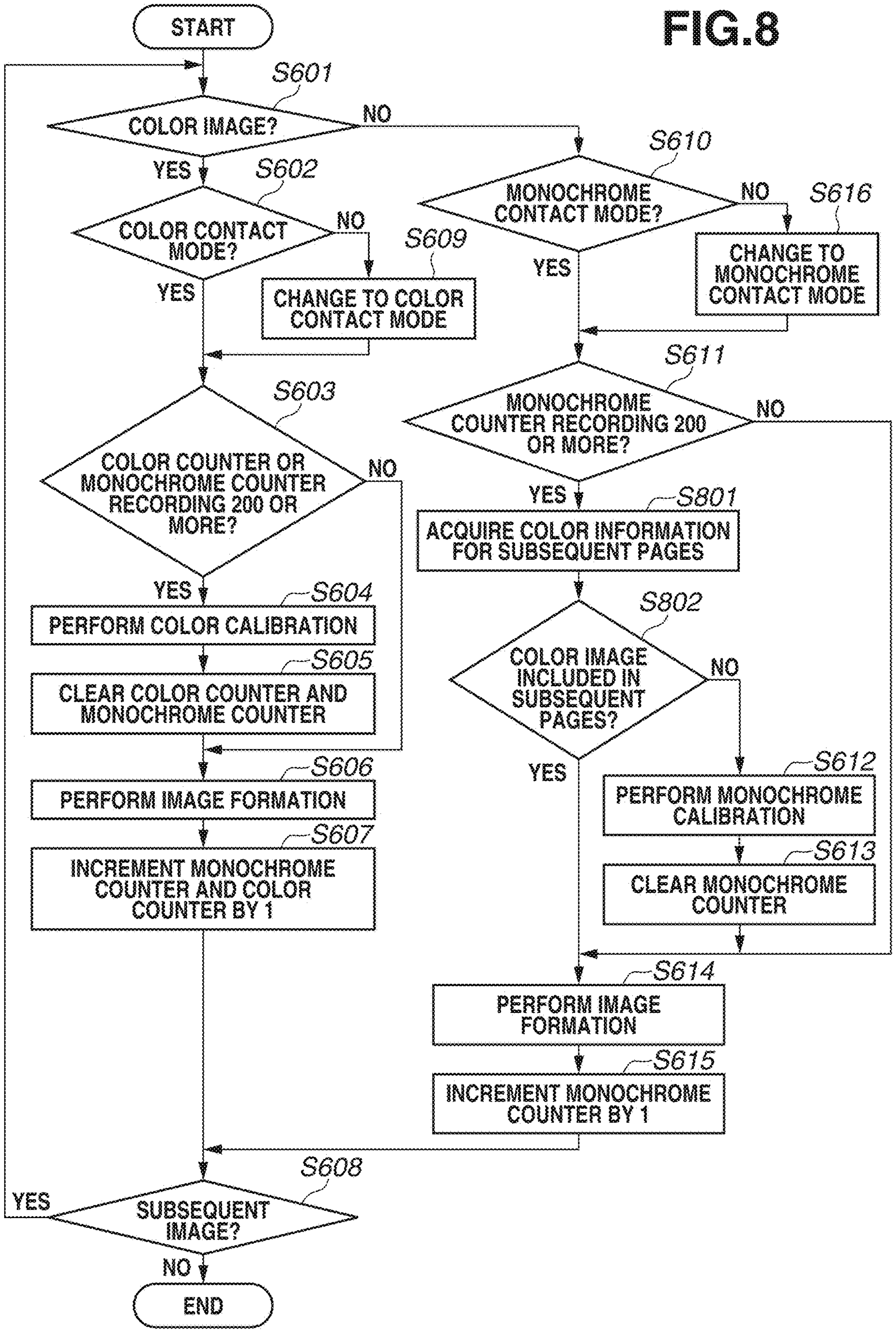
FIG. 8 is a flowchart of a calibration execution determination process according to the present exemplary embodiment.

FIG. 8 illustrates a procedure of a calibration execution determination in the present exemplary embodiment. This process is performed by the CPU 103 loading programs stored in the HDD 102 into the memory 104 and executing the programs. The process is started when an image formation job is executed. Steps S601 to S615 in the process procedure according to the present exemplary embodiment are the same as those with the same reference numerals illustrated in FIG. 6, and the description thereof will be omitted.

(Monochrome Image Formation Mode)

The following description will start with a state in which image processing of a monochrome page is executed and the monochrome image formation mode (the monochrome contact mode) is set (if the determination result is YES in step S610 and the contact mode is changed to the monochrome contact mode in step S616).

In step S611, the CPU 103 determines whether the monochrome counter in the memory 104 records 200 or more. If the CPU 103 determines that the monochrome counter records less than 200 (NO in step S611), the process proceeds to step S614. If the CPU 103 determines that the monochrome counter records 200 or more (YES in step S611), the process proceeds to S801.

In step S801, the CPU 103 instructs the acquisition unit 114 to acquire color information for the subsequent four pages, i.e., the next four consecutive sheets).

In step S802, the CPU 103 determines whether a color image is included in the color information acquired in step S801. If the CPU 103 determines that a color image is included (YES in step S802), the process proceeds to step S614. If not (NO in step S802), the process proceeds to step S612.

In step S612, the monochrome calibration is performed, and in step S613, the monochrome counter is cleared. Even though the monochrome counter records 200 or more when a full-color image is included in the following four pages (sheets), the monochrome image forming operation is performed without a monochrome calibration in step S614. In step S615, the CPU 103 increments the monochrome counter by 1 and saves the incremented value in the memory 104. The monochrome image forming process is then ended.

Carrying out the above calibration execution determination procedure prevents the unnecessary execution of monochrome calibrations when jobs with a mixture of color and monochrome images are performed. This makes it possible to reduce unnecessary downtime.

In the above-described procedure, the number of pages (sheets) is four for obtaining color information for the subsequent images, but the present disclosure is not limited to this. Setting a larger value makes it possible to predict a switch to a color image in a longer range.

Calibration Execution Determination Flow (Second Exemplary Embodiment)

Figure 9:
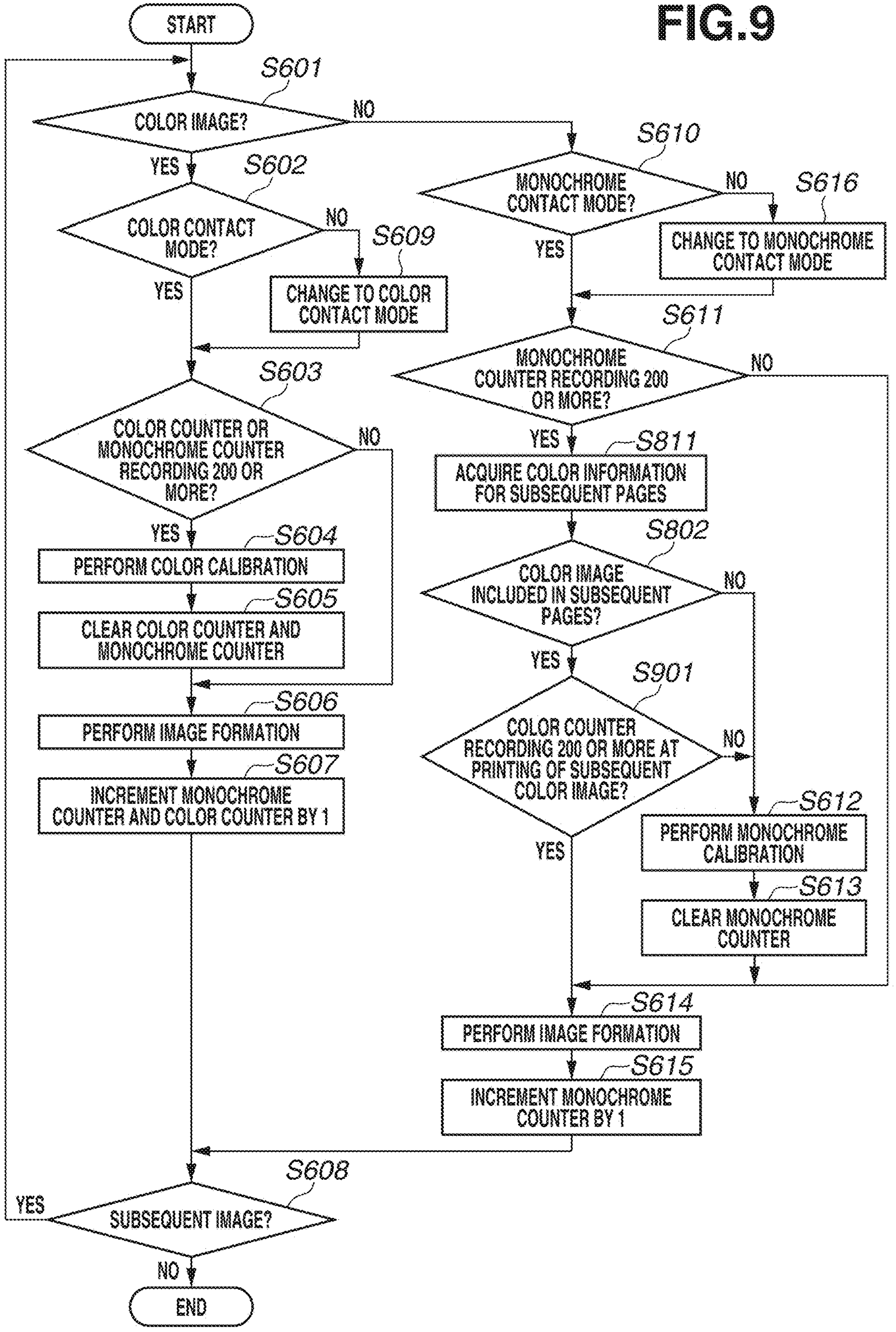
FIG. 9 is a flowchart of a calibration execution determination process according to another exemplary embodiment.

A second exemplary embodiment will now be described. In the first exemplary embodiment, unnecessary monochrome calibrations can be prevented by acquiring color information for the subsequent images. In the present exemplary embodiment, a monochrome calibration execution determination is performed considering the possibilities that the subsequent images may include a full-color image and that the color counter may reach 200. FIG. 9 illustrates the procedure of an image adjustment (a calibration) determination according to the present exemplary embodiment.

In the execution determination procedure of FIG. 9, the same steps as those in FIGS. 6 and 8 are given the same reference numerals and the description thereof will be omitted. The difference between the execution determination procedure in FIG. 9 and the execution determination procedure in FIG. 8 is that, in step S901, it is determined whether the color counter records 200 or more when the subsequent color image is printed.

If the monochrome counter records 200 or more and the subsequent images include a color image, the process proceeds to step S901.

In step S901, a CPU 103 determines whether the color counter will record 200 or more when the subsequent color image is printed. If the CPU 103 determines that the color counter will record 200 or more when the subsequent color image is printed (YES in step S901), the process proceeds to step S614. If not (NO in step S901), the process proceeds to step S612.

If the CPU 103 determines in step S901 that the color counter will record 200 or more, the CPU 103 determines that a color calibration is performed at the time of printing the subsequent color image. In this case, the monochrome image formation is performed in step S614 without a monochrome calibration.

On the other hand, if the CPU 103 determines in step S901 that the color counter will not record 200 or more, the CPU 103 determines that a color calibration is unlikely to be performed in the near future. In this case, the monochrome calibration is performed in step S612. The monochrome counter is cleared (reset to 0) and the cleared state is saved in the memory 104 in step S613, and the monochrome image formation is performed in step S614.

As described above, performing a calibration execution determination according to the present exemplary embodiment enables skipping a monochrome calibration at the timing only when both the monochrome calibration and the color calibration are scheduled to be executed.

According to the image forming apparatus of the present disclosure, frequent image adjustments can be prevented.

Embodiment(s) of the present disclosure can also be realized by a computer of a system or apparatus that reads out and executes computer executable instructions (e.g., one or more programs) recorded on a storage medium (which may also be referred to as non-transitory computer-readable storage medium) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-043249, filed Mar. 19, 2024, which is hereby incorporated by reference herein in its entirety.

What is claimed is:

1. An image forming apparatus configured to operate an image forming job including a color image formation mode and a monochrome image formation mode, the image forming apparatus comprising:

a first counter configured to perform a count of sheets on which color images are formed;

a second counter configured to perform another count of sheets on which monochrome images are formed;

one or more controllers that acquire information for at least one image on each sheet of the image forming job, wherein the one or more controllers:

in a case where a value of the count exceeds a first threshold in the color image formation mode, perform an image adjustment in the color image formation mode;

in a case where a value of the another count exceeds a second threshold in the monochrome image formation mode and information for at least one subsequent image does not include a full-color image, perform an image adjustment in the monochrome image formation mode; and in a case where the information for the at least one subsequent image includes a full-color image, perform an image adjustment in the color image formation mode when the at least one subsequent full-color image is formed without performing an image adjustment in the monochrome image formation mode.

2. The image forming apparatus according to claim 1, wherein:

in a case where the value of the another count exceeds the second threshold, the one or more controllers determine whether the information for the at least one subsequent image includes the full-color image, and in a case where the subsequent images do not include a full-color image, one or more controllers perform the image adjustment in the monochrome image formation mode, in a case where the information for the subsequent images includes the full-color image, the one or more controllers determine whether the value of the first counter exceeds the first threshold when the at least one subsequent full-color image is formed, in a case where the first threshold is exceeded, the one or more controllers do not perform the image adjustment in the monochrome image formation mode, and in a case where the first threshold is not exceeded, the one or more controllers perform the image adjustment in the monochrome image formation mode.

3. The image forming apparatus according to claim 1, further comprising a transfer belt configured to transfer toner images formed on a plurality of drums, wherein:

in the color image formation mode, each drum of the plurality of drums and the transfer belt contact each other, and in the monochrome image formation mode, one drum of the plurality of drums and the transfer belt contact each other.

4. A method of controlling an image forming apparatus including a first counter configured to perform a count of sheets on which color images are formed, and a second counter configured to perform another count of sheets on which monochrome images are formed, the image forming apparatus configured to operate in one or more of a color image formation mode and a monochrome image formation mode, the method comprising:

acquiring information for an image on each sheet of an image forming job;

in a case where a value of the count exceeds a first threshold in the color image formation mode, performing an image adjustment in the color image formation mode;

in a case where a value of the another count exceeds a second threshold in the monochrome image formation mode and the information for at least one subsequent image includes does not include a full-color image, performing an image adjustment in the monochrome image formation mode; and in a case where the information for the at least one subsequent image includes a full-color image, perform the image adjustment in the color image formation mode when the at least one subsequent color image is formed without performing an image adjustment in the monochrome image forming mode.

5. A non-transitory computer readable storage medium including a program causing an image forming apparatus including a first counter configured to perform a count of sheets on which color images are formed, a second counter configured to perform another count of sheets on which monochrome images are formed, the image forming apparatus including a color image formation mode, and a monochrome image formation mode to perform an image forming method, the program causing the image forming apparatus to:

acquire information for an image on each sheet of an image forming job;

in a case where a value of the count exceeds a first threshold in the color image formation mode, perform an image adjustment in the color image formation mode;

in a case where a value of the another count exceeds a second threshold in the monochrome image formation mode and the information for at least one subsequent image does not include a full-color image, perform an image adjustment in the monochrome image formation mode; and in a case where the information for the at least one subsequent image includes a full-color image, perform the image adjustment in the color image formation mode when the at least one subsequent color image is formed without performing an image adjustment in the monochrome image forming mode.

* * * * *